United States Patent
Park et al.

(10) Patent No.: US 7,920,449 B2
(45) Date of Patent: Apr. 5, 2011

(54) METHOD OF CONTROLLING FOCUS OF OPTICAL INFORMATION STORAGE MEDIA RECORDING AND/OR REPRODUCTION APPARATUS AND APPARATUS THEREFOR

(75) Inventors: Young-jae Park, Yongin-si (KR); Sung-hyun Kim, Yongin-si (KR); Tatsuhiro Otsuka, Suwon-si (KR); Jong-hyun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 767 days.

(21) Appl. No.: 11/838,575

(22) Filed: Aug. 14, 2007

(65) Prior Publication Data

US 2008/0192591 A1 Aug. 14, 2008

(30) Foreign Application Priority Data

Feb. 14, 2007 (KR) .................. 10-2007-0015531

(51) Int. Cl.
*G11B 7/00* (2006.01)
(52) U.S. Cl. .................. 369/53.23; 369/53.28; 369/94
(58) Field of Classification Search .......... 369/44.27, 369/44.26, 53.28, 53.29, 94, 44
See application file for complete search history.

(56) References Cited

U.S. PATENT DOCUMENTS

| 5,751,675 | A | 5/1998 | Tsutsui et al. |  |
| 6,574,174 | B1 * | 6/2003 | Amble et al. | 369/44.26 |
| 6,731,578 | B1 * | 5/2004 | Sako et al. | 369/53.23 |
| 2002/0089912 | A1 | 7/2002 | Kobayashi |  |
| 2004/0202084 | A1 | 10/2004 | Manoh et al. |  |
| 2004/0207944 | A1 | 10/2004 | Ichimura |  |
| 2005/0237889 | A1 | 10/2005 | Shioura et al. |  |
| 2006/0120229 | A1 | 6/2006 | Nabeta |  |
| 2007/0104045 | A1 * | 5/2007 | Nagura | 369/44.23 |

FOREIGN PATENT DOCUMENTS

| JP | 7-037256 | 2/1995 |
| JP | 2000-99955 | 4/2000 |
| JP | 2004-164787 | 6/2004 |
| JP | 2005-332558 | 12/2005 |
| JP | 2006-155792 | 6/2006 |

OTHER PUBLICATIONS

International Search Report issued on Apr. 21, 2008 in PCT International Application No. PCT/KR2008/000019.

* cited by examiner

*Primary Examiner* — Joseph H Feild
*Assistant Examiner* — Adam R Geisy
(74) *Attorney, Agent, or Firm* — NSIP Law

(57) ABSTRACT

A focusing control method of an optical information storage media recording and/or reproduction apparatus controlling a focusing operation by moving an objective lens upwards or downwards in a direction towards or away from an optical information storage medium having a plurality of data layers includes receiving a focusing lead-in command signal to focus an optical beam on a target data layer, compensating for spherical aberration with respect to the target data layer, detecting a focus error signal based on an intensity of the optical beam reflected from the optical information storage medium and condensed by an optical detector, identifying the target data layer using an amplitude or a frequency of the focus error signal, and focusing the optical beam on the target data layer by moving the objective lens in an opposite direction from a direction in which the objective lens is initially moved.

12 Claims, 9 Drawing Sheets

METHOD OF CONTROLLING FOCUS OF OPTICAL INFORMATION STORAGE MEDIA RECORDING AND/OR REPRODUCTION APPARATUS AND APPARATUS THEREFOR

CROSS-REFERENCE TO RELATED PATENT APPLICATION

This application claims the benefit of Korean Patent Application No. 2007-15531, filed on Feb. 14, 2007, in the Korean Intellectual Property Office, the disclosure of which is incorporated herein in its entirety by reference.

BACKGROUND OF THE INVENTION

1. Field of the Invention

Aspects of the present invention relate to a method and apparatus for controlling a focusing operation, and more particularly to a method and apparatus for controlling a focusing operation between data layers of a high density optical disk having a plurality of data layers using an objective lens having a high numerical aperture and a light source with a short wavelength.

2. Description of the Related Art

In general, information storage media are employed as information recording media of an optical pickup device to record and/or reproduce information to and/or from the information storage media without contacting the information storage media. Optical disks corresponding to one type of information storage media are classified as Compact Disks (CDs) or Digital Versatile Disks (DVDs) according to an amount of information recorded, and further classified into High Density (HD)-DVDs or Blu-ray Disks (BDs), which can each record more than 15 GB.

Information storage media are continuously being developed to gradually increase recording amount capabilities. A representative method of increasing the recording amount is a method of using a recording light source having a short beam wavelength, and an objective lens having a high numerical aperture.

FIG. 1 is a cross-sectional view of a multi-layer disk. As illustrated in FIG. 1, the disk has a plurality of data layers L0, L1, L2, to Ln, wherein Ls denotes a spacer layer between data layers. The optical beam passes through a cover layer and is selectively focused on the layers Ln, L2, L1, and L0. Layer Ln is closest to the optical beam and the cover layer, and layer L0 is farthest from the optical beam and is on a substrate.

As the wavelength of a beam irradiated from a light source decreases and the numerical aperture number of an objective lens increases, the spherical aberration increases according to the variation of thickness of a transparent cover layer, resulting in degradation of a recording or reproduction signal. The amount of spherical aberration is represented using a several-order equation. If the numerical aperture of an objective lens is greater than 0.8, a high order aberration cannot be ignored, and a fourth-order spherical aberration must be considered as represented by Equation 1.

$$W_{40} = \frac{n^2 - 1}{8n^3} NA^4 \Delta d \tag{1}$$

Here, n denotes an index of refraction of a transparent cover layer, NA denotes a numerical aperture of an objective lens, $\Delta d$ denotes a thickness variation of the transparent cover layer, and $W_{40}$ denotes a fourth-order spherical aberration.

According to Equation 1, in a multi-layer optical disk recording and/or reproduction apparatus using an objective lens having a high numerical aperture (e.g. an objective lens whose numerical aperture is greater than 0.8), a high-order spherical aberration is large.

In general, when a disk is loaded, a disk recording and/or reproduction apparatus determines the type of the loaded disk, performs a focusing lead-in operation for a data layer to be recorded or reproduced, and reads control information such as focus servo information, tracking servo information, and address information from the loaded disk. The focusing lead-in operation is an operation to focus a beam spot on a data layer of a disk, and focusing is performed by using the focusing lead-in operation. After spherical aberration compensation is performed to optimize an address signal or a reproduction signal, information is recorded or reproduced.

If the focus servo slips off a focusing point due to an external shock or some other force while data is being recorded to or being reproduced from an optical disk, the focus servo should quickly return to the data layer at which the focus servo was focused on before the shock occurred. When an optical disk having more than three data layers is used (as shown in FIG. 1), focusing on a target data layer is especially important.

When the lead-in operation of the focus servo is controlled for a disk having a plurality of data layers, a method of focusing a target data layer in response to a level change of a Radio Frequency Data Collection (RFDC) signal and a focus error signal FES output from an optical pickup has been suggested. Japanese Patent Publication No. JP 2006/155792 discloses a focusing method of an optical disk having two data layers L0 and L1, and is described with reference to FIGS. 2A and 2B.

FIG. 2A illustrates a method of controlling a focusing operation in an optical disk device according to the prior art. First, a method of focusing on the data layer L1, which is closer to a cover layer than the other layer L0 is to the cover layer, is described with reference to FIG. 2A. When a focusing control operation is performed for the data layer L1 which is closer to the cover layer, an optical disk recording and/or reproduction apparatus performs spherical aberration compensation for the target data layer L1 and detects an RFDC signal and a focus error signal FES illustrated in FIG. 2A while moving an objective lens upwards towards a loaded optical disk.

If the RFDC signal is higher than a slice level $S_{rec}$, and if the focus error signal FES meets a zero crossing point, the optical disk recording and/or reproduction apparatus determines that the focus of an optical beam is approaching the target data layer L1 and outputs a focus-servo-on signal. Specifically, if the focus error signal FES crosses the zero crossing point (at the x-axis in FIG. 2A) when dropping from a level higher than a slice level $S_{fe}^+$ to a level lower than a slice level $S_{fe}^-$ or vise versa, the optical disk recording and/or reproduction apparatus determines that the target data layer L1 has been identified.

Next, a method of focusing on the data layer L0 farther from the cover layer is described with reference to FIG. 2B. When a focusing control operation is performed for the data layer L0 farther from the cover layer, the optical disk recording and/or reproduction apparatus performs spherical aberration compensation for the target data layer L0 and detects an RFDC signal and a focus error signal FES illustrated in FIG. 2B while moving the objective lens towards the optical disk. The optical disk recording and/or reproduction apparatus detects the target data layer L0 as described above with reference to the target data layer L1, and waits for a redetection time $T_r$ from a zero crossing point of the focus error signal FES. If a new data layer is not detected during the redetection time $T_r$, the optical disk recording and/or reproduction apparatus determines that the most recently detected data layer is the target data layer L0. In this case, since the objective lens is moving upwards, the optical disk recording and/or reproduction apparatus performs the focusing lead-in operation on the target data layer L0 by moving the objective lens back downwards for an over-run time $T_{over}$, which is an amount of time that the objective lens has been moving upward away from the target data layer L0, from when the RFDC signal becomes lower than the slice level $S_{rec}$. On the other hand, if a new data layer is detected during the redetection time $T_r$, the optical disk recording and/or reproduction apparatus ignores the previously detected data layer L1 as not being the target data layer L0, and determines that the new data layer is the target data layer L0.

FIG. 3 is a diagram illustrating a known operation to focus an optical beam on a position in a focusing lead-in process. It is assumed in FIG. 3 that a data layer closer to a cover layer is a data layer L1, and a data layer farther from the cover layer is a data layer L0. If a target data layer is the data layer L1, when a focus error signal FES passes a zero crossing point in the data layer L1, the optical disk recording and/or reproduction apparatus determines that the focal point of an optical beam is approaching the target data layer L1 and outputs a focus-servo-on signal. If the target data layer is the data layer L0, the optical disk recording and/or reproduction apparatus detects the data layer L0 and waits for the redetection time $T_r$ from a zero crossing point of the focus error signal FES. If a new data layer is not detected during the redetection time $T_r$, the optical disk recording and/or reproduction apparatus moves the objective lens downwards to move the focal point of the optical beam back on the data layer L0.

As described above, according to the prior art, a data layer is determined using the redetection time $T_r$. However, it is difficult to accurately measure a zero crossing point due to spherical aberration in an optical disk having multiple data layers. Thus, it is difficult to accurately measure the redetection time $T_r$.

In addition, in an optical disk having multiple data layers, since focusing can be performed only for a data layer that is farthest from a cover layer and a data layer that is closest to the cover layer, data layers located between the farthest data layer and the closest data layer cannot be detected.

SUMMARY OF THE INVENTION

Aspects of the present invention provide a focus control method of an optical disk recording and/or reproduction apparatus, whereby a focus lead-in operation is quickly and accurately performed for all data layers of a high-density multi-layer optical disk, and an apparatus for performing the method.

According to an aspect of the present invention, a method of controlling a focusing operation by moving an objective lens in a direction towards or away from an optical information storage medium having a plurality of data layers includes receiving a focusing lead-in command signal to focus an optical beam on a target data layer which has a largest Radio Frequency Data Collection (RFDC) level of RFDC levels of the plurality of the data layers, compensating for spherical aberration with respect to the target data layer, detecting a focus error signal based on an intensity of the optical beam reflected from the optical information storage medium and condensed by an optical detector, identifying the target data layer using an amplitude or a frequency of the focus error signal; and focusing the optical beam on the target data layer by moving the objective lens in an opposite direction from a direction in which the objective lens is initially moved.

According to an aspect of the present invention, the focusing of the optical beam on the target data layer includes turning a focus servo signal on.

According to an aspect of the present invention, the identifying of the target data layer includes identifying a data layer having a greatest amplitude of the focus error signal among a plurality of amplitudes corresponding to the plurality of data layers as the target data layer.

According to an aspect of the present invention, the determining of the target data layer further includes detecting an n-th data layer from among the plurality of data layers, detecting an (n+1)-th data layer by moving the objective lens towards the optical information storage medium, and comparing an amplitude between a highest level and a lowest level of the focus error signal with respect to the n-th data layer and an amplitude between a highest level and a lowest level of the focus error signal with respect to the (n+1)-th data layer.

According to an aspect of the present invention, the method further includes identifying the n-th data layer as the target data layer when the amplitude between the highest level and the lowest level of the focus error signal with respect to the n-th data layer is greater than the amplitude between the highest level and the lowest level of the focus error signal with respect to the (n+1)-th data layer, and moving the objective lens away from the optical information storage medium.

According to an aspect of the present invention, the method further includes moving the objective lens towards the optical information storage medium until an (n+2)-th data layer is detected when the amplitude between the highest level and the lowest level of the focus error signal with respect to the (n+1)-th data layer is greater than the amplitude between the highest level and the lowest level of the focus error signal with respect to the n-th data layer.

According to an aspect of the present invention, the identifying of the target data layer includes identifying a data layer having a lowest frequency of the focus error signal among a plurality of frequencies corresponding to the plurality of data layers as the target data layer.

According to an aspect of the present invention, the identifying of the target data layer further includes detecting an n-th data layer from among the plurality of data layers, detecting an (n+1)-th data layer by moving the objective lens towards the optical information storage medium, and comparing a frequency of the focus error signal with respect to the n-th data layer and the frequency of the focus error signal with respect to the (n+1)-th data layer.

According to an aspect of the present invention, the method further includes identifying the n-th data layer as the target data layer when the frequency of the focus error signal with respect to the n-th data layer is less than the frequency of the focus error signal with respect to the (n+1)-th data layer, and moving the objective lens away from the optical information storage medium.

According to an aspect of the present invention, the method further includes moving the objective lens towards the optical information storage medium until an (n+2)-th data layer is detected when the frequency of the focus error signal with respect to the (n+1)-th data layer is less than the frequency of the focus error signal with respect to the n-th data layer.

According to an aspect of the present invention, the method further includes identifying the n-th data layer as the target data layer when no more data layers are detected when a focus drive signal used to move the objective lens reaches a predetermined level when the n-th data layer is detected, and moving the objective lens away from the optical information storage medium.

According to an aspect of the present invention, the focus drive signal is generated so that a speed of the objective lens moving away from the optical information storage mediums is greater than a speed of the objective lens moving towards the optical information storage medium.

According to another aspect of the present invention, an optical information storage medium recording and/or reproduction apparatus includes an optical pickup to condense light reflected from a loaded optical information storage medium having a plurality of data layers into an optical detector by moving an objective lens towards or away from the optical information storage medium, a Radio Frequency (RF) amplifier to generate a focusing error signal from the condensed light, a spherical aberration compensator to compensate for spherical aberration with respect to a target data layer which has a largest Radio Frequency Data Collection (RFDC) level of RFDC levels of the plurality of the data layers on the optical information storage medium when a focusing lead-in command signal is input to focus the light on the target data layer, a servo signal processing unit to identify the target data layer using an amplitude or a frequency of the focusing error signal and to output a focusing drive signal used to move the objective lens in an opposite direction from a direction in which the objective lens is initially moved if the target data layer is identified, and a driver to drive the optical pickup using the focusing drive signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
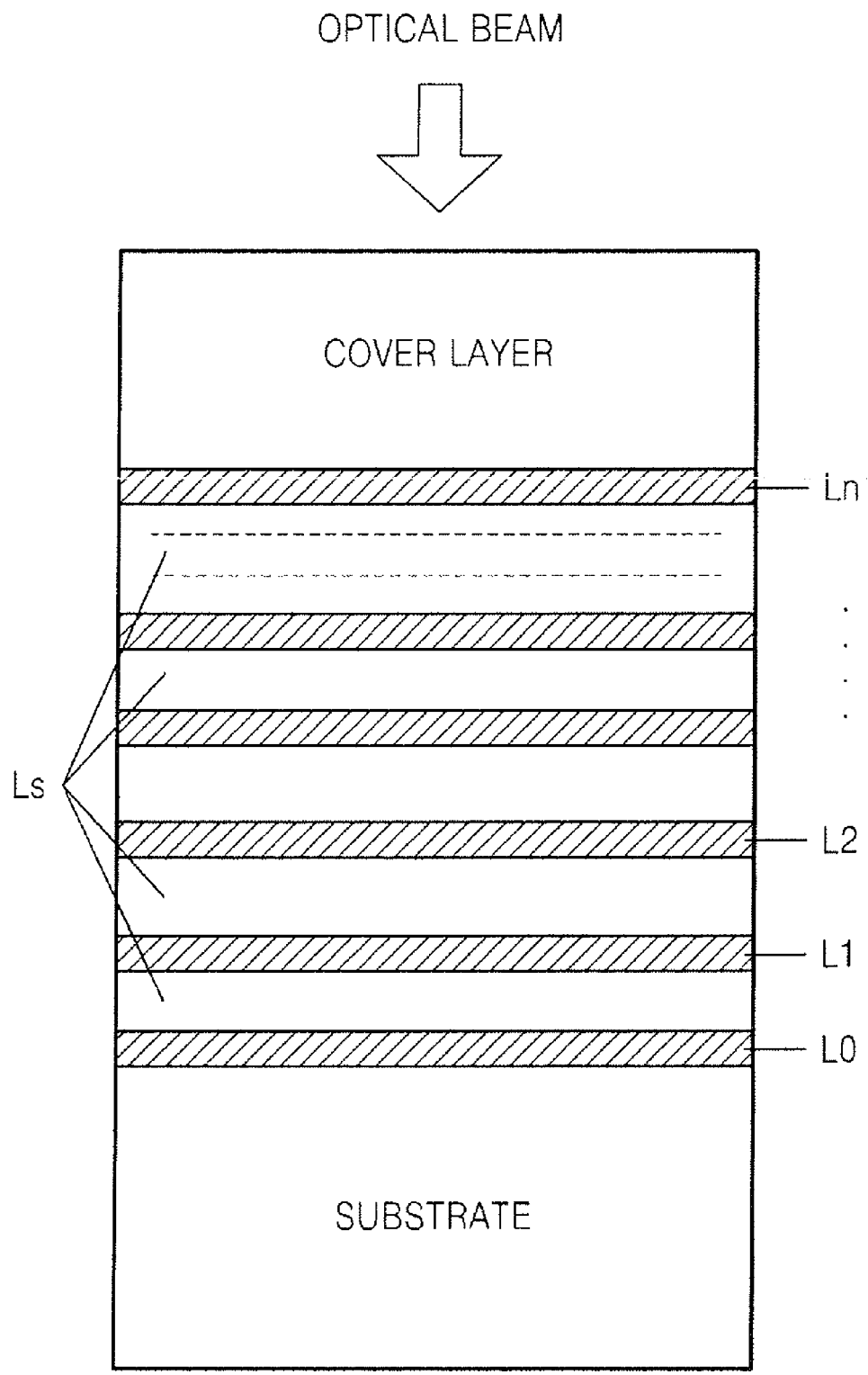
FIG. 1 is a cross-sectional view of a multi-layer disk.
Figure 2A:
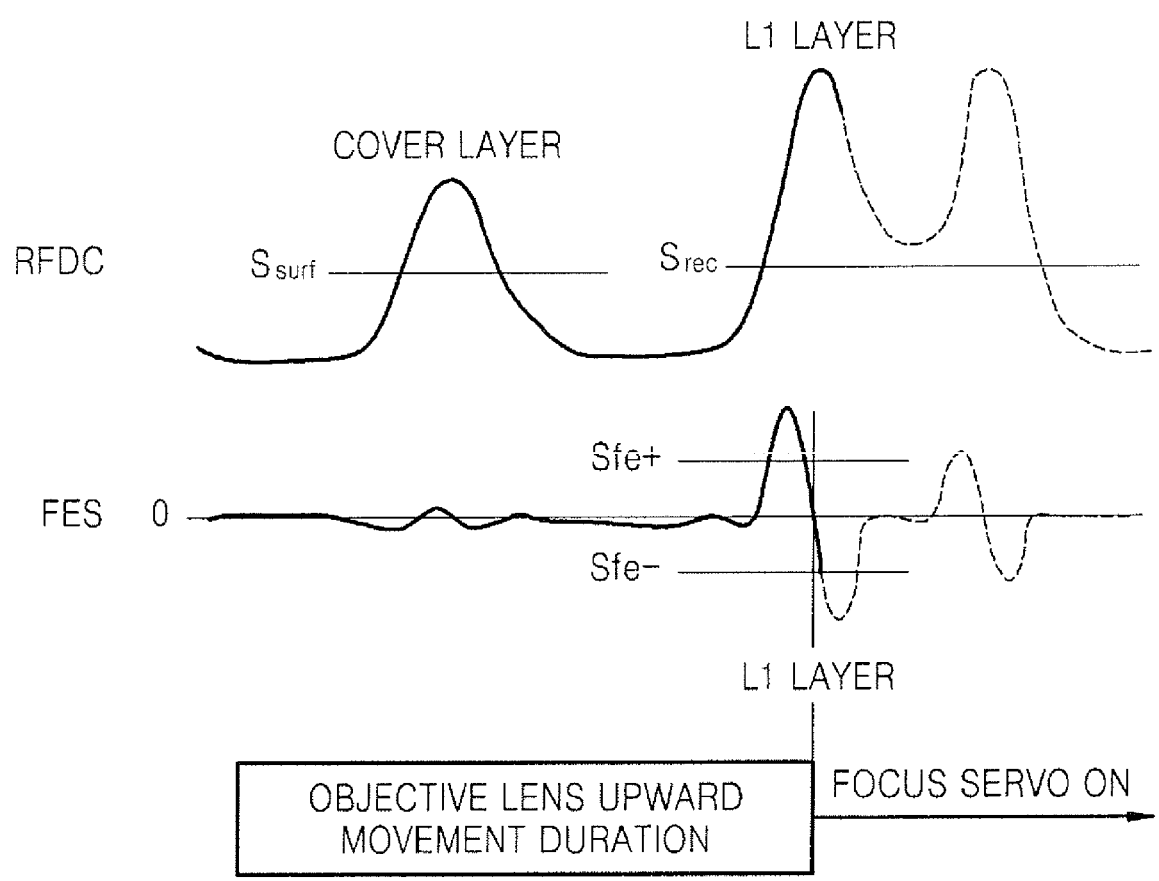
FIGS. 2A and 2B illustrate a method of controlling a focusing operation in an optical disk device according to the prior art.
Figure 2B:
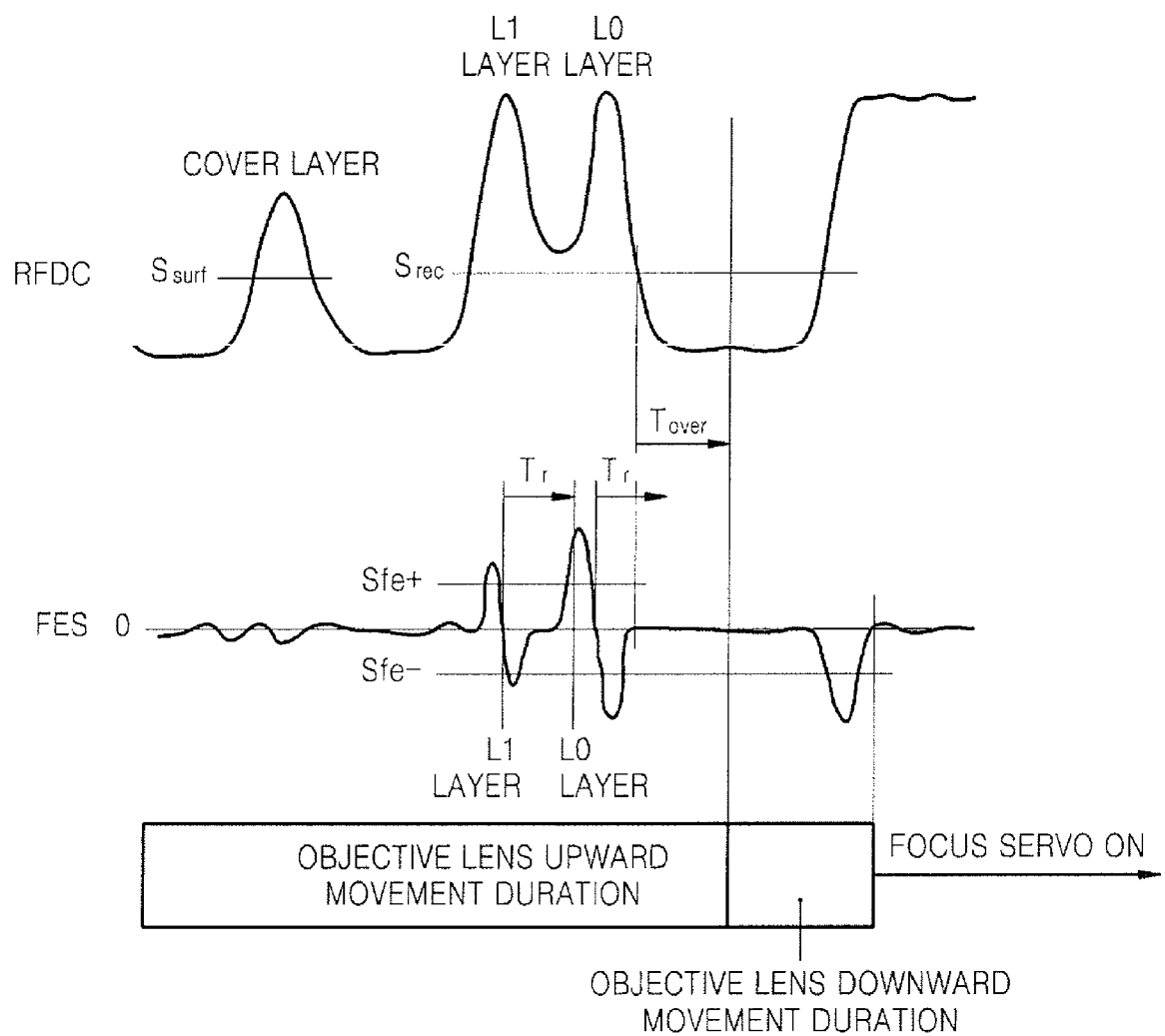
Figure 3:
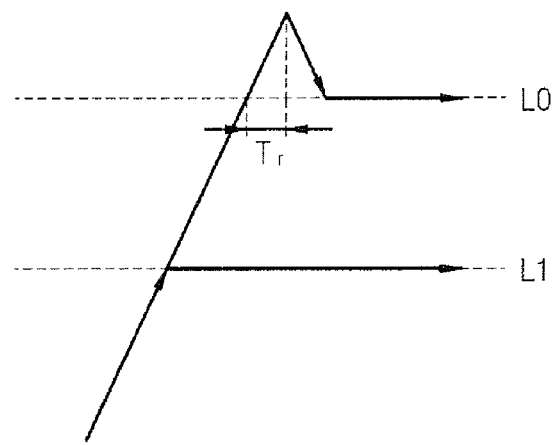
FIG. 3 is a diagram illustrating a position on which an optical beam is focused in a focusing lead-in process according to the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
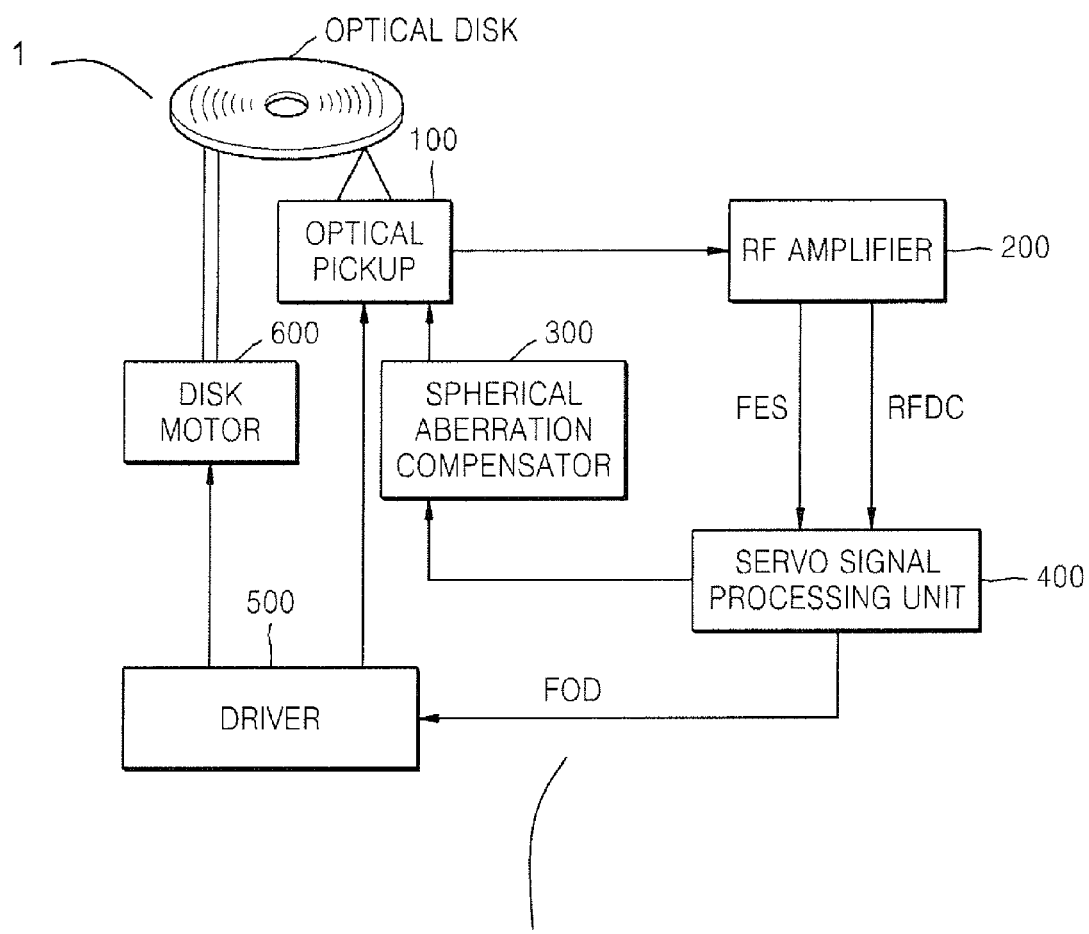
FIG. 4 is a block diagram of an optical disk recording and/or reproduction apparatus according to an embodiment of the present invention.

FIG. 4 is a block diagram of an optical disk recording and/or reproduction apparatus 10 according to an embodiment of the present invention. Referring to FIG. 4, the optical disk recording and/or reproduction apparatus 10 includes an optical pickup 100, a Radio Frequency (RF) amplifier 200, a spherical aberration compensator 300, a servo signal processing unit 400, a driver 500, and a disk motor 600.

The optical pickup 100 is driven by a tracking actuator (not shown) to track servo control operations and a focusing actuator (not shown) to focus servo control operations and to convert an optical beam 140 (FIG. 5), which is condensed by emitting light onto a loaded optical disk 1, into an electric RF signal. In other words, the optical pickup 100 optically reads information recorded in the optical disk 1, converts the information into an electric RF signal, and outputs the electric RF signal to the RF amplifier 200. It is understood that the optical pickup 100 may also record information to the optical disk 1 in other aspects of the present invention.

The RF amplifier 200 amplifies the RF signal input from the optical pickup 100. In detail, the RF amplifier 200 generates a focus error signal FES by calculating light received from a 4-split optical detector 180 (FIG. 5) included in the optical pickup 100 using an astigmatic method [(A+C)−(B+D)] and generates a Radio Frequency Data Collection (RFDC) signal corresponding to a sum signal by adding the light received from the 4-split optical detector (A+B+C+D). It is understood that the RF amplifier 200 is not limited to using an astigmatic method, and may instead use other methods, algorithms, or formulas known in the art. Moreover, the optical detector 180 can have other configurations and/or other numbers of splits, and the focus error signal FES can be otherwise generated. Lastly, the optical disk recording and/or reproduction apparatus 10 reproduces the RF amplified signal 200 to reproduce data recorded on the disk 1.

The spherical aberration compensator 300 maintains the focal point of the optical beam 140 on a first focal point of one of a plurality of data layers Ln or maintains the focal point of the optical beam on a second focal point of another data layer based on the first focal point, in order to compensate for an inter-layer thickness difference between optical disks. If a focusing lead-in command is input to the recording and/or reproduction apparatus 10 from an input unit (not shown), the spherical aberration compensator 300 performs spherical aberration compensation for a target data layer Ln on which data is to be recorded to and/or reproduced from the loaded optical disk 1. According to an aspect of the present invention, the target data layer Ln has a highest RFDC level among each of the data layers on the optical disk 1.

The servo signal processing unit 400 receives the focus error signal FES and the RFDC signal from the RF amplifier 200 and adjusts the focal point of the optical beam 140 by outputting a focus drive signal FOD to the driver 500. When the driver 500 receives the FOD, the driver 500 moves an objective lens 130 (FIG. 5) upwards or downwards in a perpendicular direction towards or away from the surface of the optical disk 1. If the focusing lead-in command is input from the input unit, the servo signal processing unit 400 moves the focal point of the optical beam 140 from one data layer Ln to another using the focus error signal FES and the RFDC signal. This movement is described below in detail with reference to FIGS. 8, 9, and 10.

The driver 500 includes a focusing actuator (not shown) and a focus drive (not shown) and moves the objective lens 130 upwards or downwards in a perpendicular direction to the surface of the optical disk 1 by driving the focusing actuator using the focus drive signal FOD input from the servo signal processing unit 400. The disk motor 600 rotates the optical disk by using a method known in the art, such as, for example, a Constant Linear Velocity (CLV) method or a Constant Angular Velocity (CAV) method, using a disk drive signal input form the driver 500. The driver 500 and disk motor 600 may be embodied in a variety of forms. For example, the disk motor 600 may be a spindle motor or some other kind of motor commonly used in optical disk recording and/or reproduction apparatuses.

Figure 5:
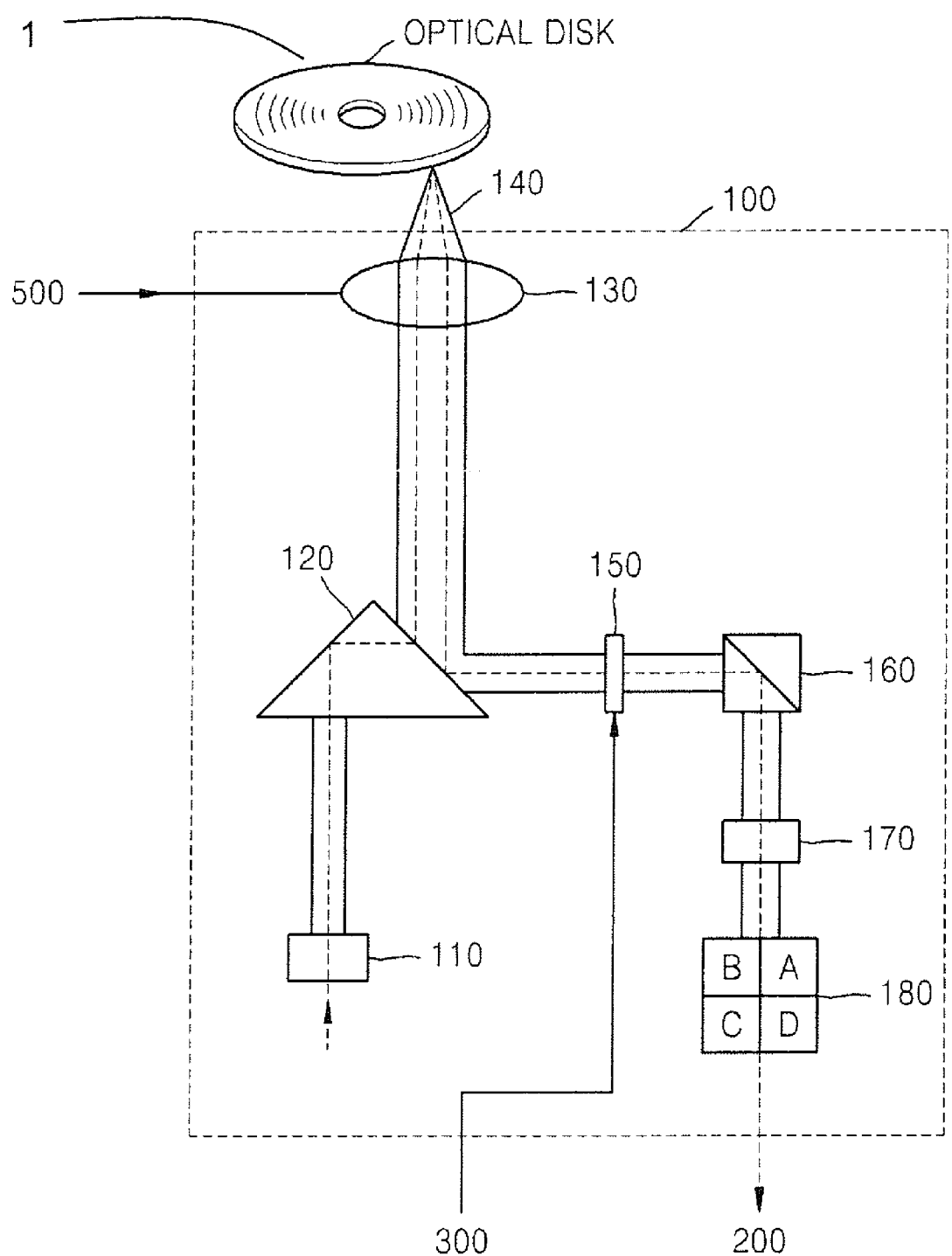
FIG. 5 is a configuration of an optical pickup according to an embodiment of the present invention.

FIG. 5 is a configuration of the optical pickup 100 according to an embodiment of the present invention. Referring to FIG. 5, the optical pickup 100 includes a Laser Diode (LD) 110, a reflective mirror 120, an objective lens 130, an optical beam 140, a collimator lens 150, a beam splitter 160, a condensing lens 170, and a 4-split optical detector 180. It is understood that the optical pickup 100 is not limited to having the components illustrated in FIG. 4 and described below, and may have additional lenses, additional light sources, beam splitters, photodetectors, and other components known in the art. Moreover, the light source is not limited to the shown LD 100.

If the LD 110 is in an on state, light emitted from the LD 110 is reflected by the reflective mirror 120 and is incident on the objective lens 130. The light output from the objective lens 130 is focused and condensed onto the optical disk 1 as the optical beam 140. The light reflected from the optical disk 1 passes through the collimator lens 150 and is split by the beam splitter 160. While not shown, a quarter wavelength plate may be used to separate light to be focused on the disc 1 from light reflected from the disc 1. The spherical aberration compensator 300 transmits a signal to the collimator lens 150 in order to compensate for a spherical aberration which occurs according to the thickness of the optical disk 1. The collimator lens 150 is movable to adjust a position of the optical disk 1 on which the focal point is focused.

The light split by the beam splitter 160 is condensed by the condensing lens 170, and the condensed light is transmitted to the 4-split optical detector 180. The 4-split optical detector 180 controls the intensity of the light transmitted from the condensing lens 170. The condensed light is incident to A, B, C, and D regions of the 4-split optical detector 180 according to the movement of the objective lens 130, as illustrated in FIGS. 6A, 6B, and 6C, and is transmitted to the RF amplifier 200.

The RF amplifier 200 generates the focus error signal FES by calculating light received from the 4-split optical detector 180 using the astigmatic method [(A+C)−(B+D)], generates the RFDC signal by adding the light received from the 4-split optical detector (A+B+C+D), and outputs the focus error signal FES and the Radio Frequency Data Collection RFDC signal to the servo signal processing unit 400. It is understood that methods other than the astigmatic method may be used according to other aspects of the present invention. A process of generating the focus error signal FES using the astigmatic method according to the movement of the objective lens 130 will now be described with reference to FIGS. 6A, 6B, 6C, and 7A through 7C.

Figure 6A:
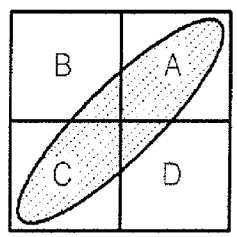
FIG. 6A shows a pattern of light condensed by a 4-split optical detector when an optical beam is approaching a data layer.
Figure 6B:
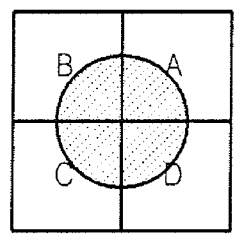
FIG. 6B shows a pattern of light condensed by the 4-split optical detector when an optical beam is accurately focused on the data layer.
Figure 6C:
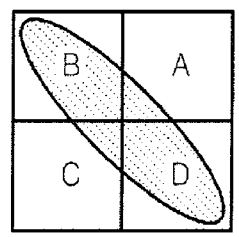
FIG. 6C shows a pattern of light condensed by the 4-split optical detector when an optical beam is moving away from the data layer.
Figure 7A:
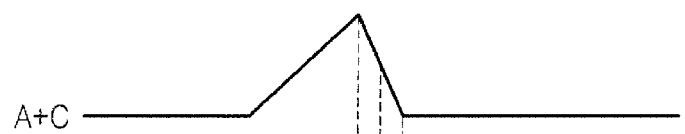
FIGS. 7A through 7C illustrate focus error signals generated according to the optical patterns illustrated in FIGS. 6A, 6B, and 6C.
Figure 7B:
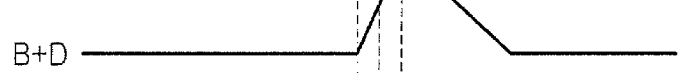
Figure 7C:
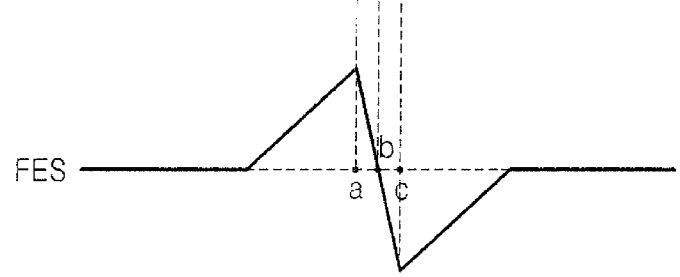

FIG. 6A shows a pattern of light condensed by the 4-split optical detector 180 when the optical beam 140 is approaching a data layer Ln. FIG. 6B shows a pattern of light condensed by the 4-split optical detector 180 when the optical beam 140 is accurately focused on the data layer Ln. FIG. 6C shows a pattern of light condensed by the 4-split optical detector 180 when the optical beam 140 is moving away from the data layer Ln. FIGS. 7A through 7C illustrate the focus error signals FES generated according to the optical patterns illustrated in FIGS. 6A, 6B, and 6C.

When the optical beam 140 transmitted through the objective lens 130 is approaching the data layer Ln, the light condensed by the 4-split optical detector 180 is not uniform. Instead, the light is primarily condensed in the A and C regions among the 4 split regions, as illustrated in FIG. 6A. Thus, as illustrated in FIGS. 7A through 7C, at a position a, a value (A+C) has the maximum value as shown in FIG. 7A, and a value (B+D) has the minimum value as shown in FIG. 7B. Since, according to an aspect of the present invention, the focus error signal FES is determined using the astigmatic method [(A+C)−(B+D)], the focus error signal FES shown in FIG. 7C therefore has a maximum value when the objective lens 130 is approaching the data layer Ln.

As shown in FIG. 6B, in an on focus state in which the optical beam 140 transmitted through the objective lens 130 is accurately focused on the data layer Ln, the light condensed by the 4-split optical detector 180 is uniformly condensed onto the 4 split regions A, B, C, and D, as illustrated in FIG. 6B. Accordingly, the focus error signal FES shown in FIG. 7C at point b has a value of 0 when the objective lens is accurately focused on the data layer Ln.

When the optical beam 140 transmitted through the objective lens 130 is moving away from the data layer Ln, the light condensed by the 4-split optical detector 180 is not uniform. Instead, the light is primarily condensed in the B and D regions among the 4 split regions, as illustrated in FIG. 6C. Thus, as illustrated in FIGS. 7A through 7C, at a position c, the value (A+C) has a minimum value as shown in FIG. 7A, and the value (B+D) has a maximum value as shown in FIG. 7B. Accordingly, the focus error signal FES shown in FIG. 7C has a minimum value when the objective lens 130 is moving away from the data layer. Thus, when the focus error signal FES is measured by moving the objective lens 130 towards and away from the data layer Ln and using the astigmatic method, the results of the focus error signal FES may be illustrated as a pattern having an S curve according to the movement of the objective lens 130.

Figure 8:
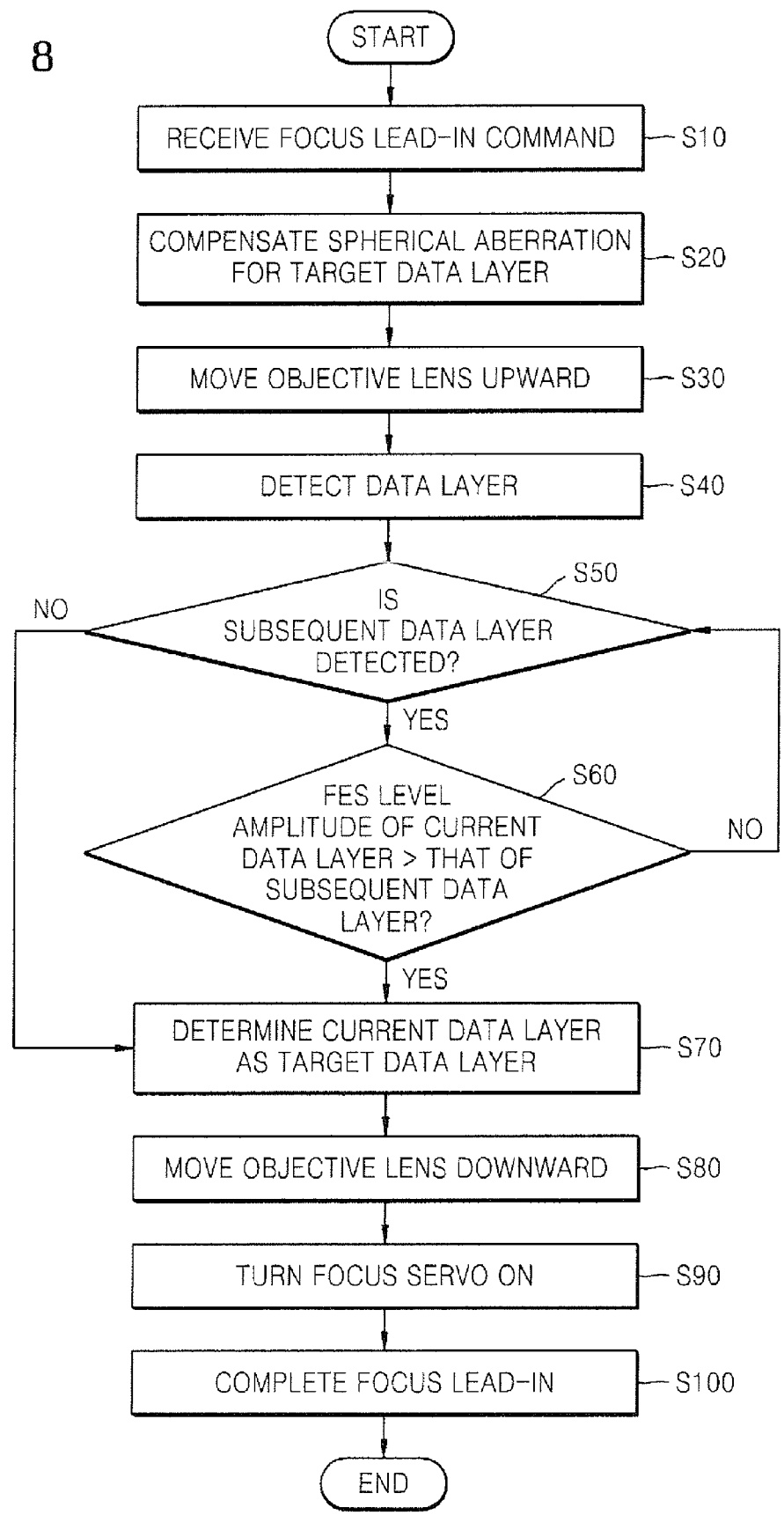
FIG. 8 is a flowchart of a focusing lead-in process according to an embodiment of the present invention.
Figure 9:
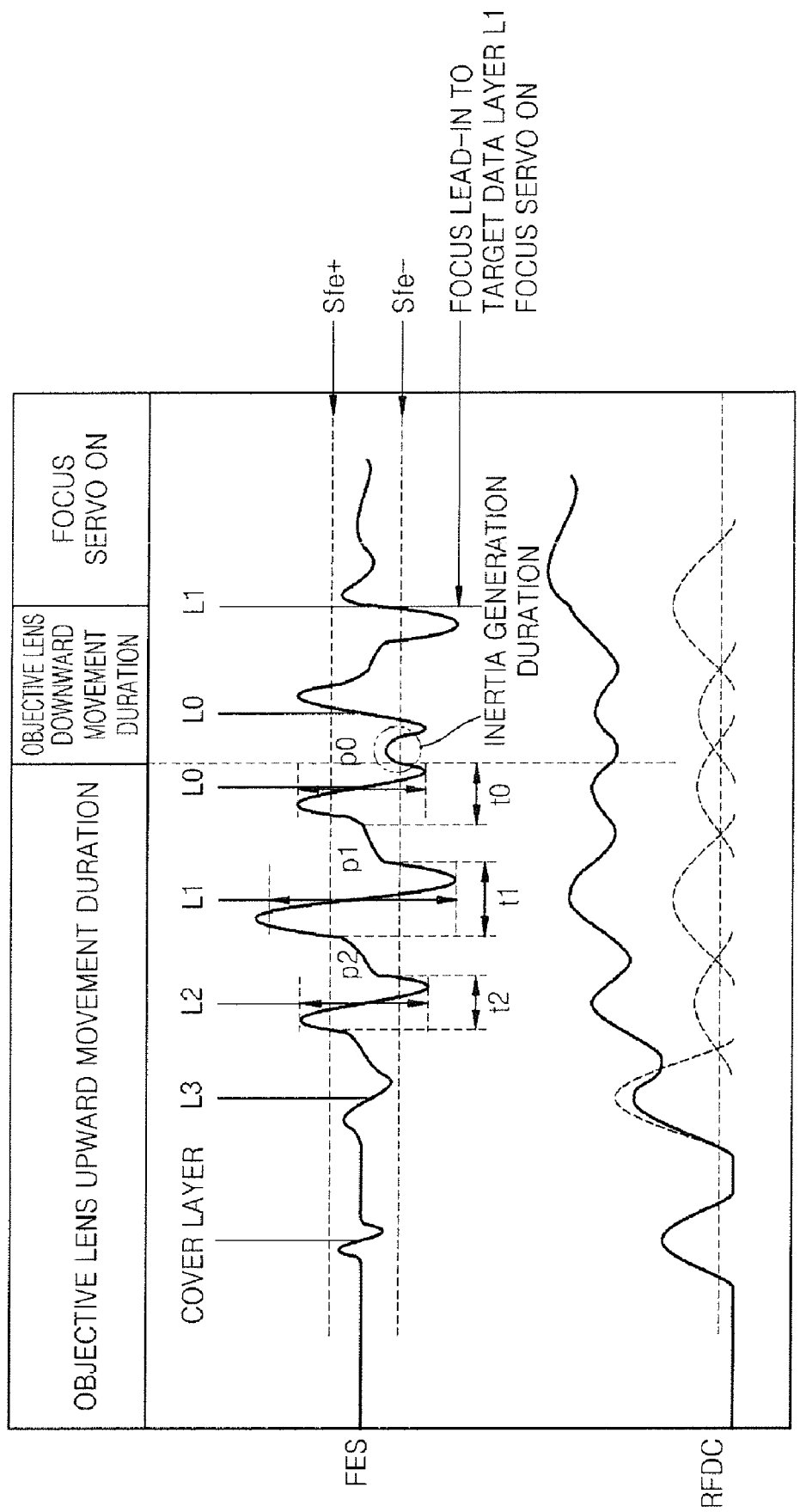
FIG. 9 illustrates signals output to a target data layer during a focusing lead-in process according to an embodiment of the present invention.

A method of performing a focus lead-in operation to focus the optical beam 140 on a target data layer Ln, for example, when an external shock affects a focusing operation or when the optical pickup 100 is approaching the target data layer Ln, will now be described. FIG. 8 is a flowchart of a focusing lead-in process according to an embodiment of the present invention. FIG. 9 illustrates signals output to a target data layer Ln during a focusing lead-in process according to an embodiment of the present invention. As an example, it is assumed that the target data layer Ln is a data layer L1, and repeated descriptions of the output signals illustrated in FIG. 9 will be omitted. It is understood that aspects of the present invention can be used to perform focusing lead-in operations on data layers other than the data layer L1, and that L1 is used for exemplary purposes only.

Referring to FIG. 8, at operation S10, a focusing lead-in command to focus the optical beam 140 on the target data layer L1 is input from an input unit. At operation S20, the spherical aberration compensator 300 performs spherical aberration compensation with respect to the target data layer L1.

After performing the spherical aberration compensation with respect to the target data layer L1 at operation S20, the servo signal processing unit 400 adjusts the focal point of the optical beam 140 by outputting the focus drive signal FOD to the driver 500 so that the objective lens 130 moves in the upward direction towards the surface of the optical disk 1 at operation S30. At operation S40, the servo signal processing unit 400 detects a data layer Ln using the method described above by using the focus error signal FES and the RFDC signal. Specifically, if the RFDC signal is higher than the slice level $S_{rec}$, and if the focus error signal FES passes through a zero crossing point, the servo signal processing unit 400 determines that the data layer Ln is detected. As illustrated in FIG. 9, if the focus error signal FES drops from a level higher than the slice level $S_{fe}^+$ to a level lower than the slice level $S_{fe}^-$ or vise versa, the focus error signal FES passes through a zero crossing point.

At operation S50, in order to determine whether the detected data layer Ln is the target data layer L1, the servo signal processing unit 400 attempts to detect a subsequent data layer L(n+1) by further moving the objective lens 130 in the upward direction towards the surface of the optical disk 1. If the servo signal processing unit 400 detects the subsequent data layer L(n+1) at operation S50, the amplitude between the highest level and the lowest level of the focus error signal FES with respect to the data layer Ln is compared to the amplitude between the highest level and the lowest level of the focus error signal FES with respect to the data layer L(n+1) at operation S60. Hereinafter, the term "amplitude" refers to peak-to-peak amplitude, or in other words, a distance from a lowest level to a highest level of an oscillation in the focus error signal FES corresponding to a data layer Ln. This amplitude may also be referred to as a level amplitude.

Since distortion of the focus error signal FES is minimized when the spherical aberration is optimally compensated for with respect to the target data layer L1 at operation S20, the level amplitude of the focus error signal FES with respect to the target data layer L1 is the largest detected amplitude among the amplitudes corresponding to the different data layers L0, L1, L2, and L3, as shown in FIG. 9. Using this characteristic, the servo signal processing unit 400 accurately detects the target data layer L1 by comparing the level amplitudes of the focus error signal FES with respect to detected data layers Ln.

Thus, as a result of the comparison of the level amplitude of the focus error signal FES with respect to the data layer Ln with the level amplitude of the focus error signal FES with respect to the subsequently detected data layer L(n+1), if the amplitude between the highest level and the lowest level of the focus error signal FES with respect to the data layer Ln is greater than the amplitude between the highest level and the lowest level of the focus error signal FES with respect to the subsequently detected data layer L(n+1), the servo signal processing unit 400 determines in operation S70 that the data layer Ln is the target data layer L1 and does not move the objective lens 130 upwards any farther. As shown in FIG. 5, when the objective lens 130 moves upwards, the objective lens 130 is moving towards the optical disk 1, and when the objective lens 130 moves downwards, the objective lens 130 is moving away from the optical disk 1, since the objective lens 130 according to an aspect of the present invention is positioned below the optical disk 1. However, it is understood that the objective lens 130 is not limited to being positioned below the optical disk 1 in all aspects, and may instead be positioned in various other locations relative to the optical disk 1, such as above the optical disk 1, to a side of the optical disk 1, or in any location known in the art.

If the amplitude between the highest level and the lowest level of the focus error signal FES with respect to the data layer Ln is equal to or less than the highest level and the lowest level of the focus error signal FES with respect to the subsequently detected data layer L(n+1), the servo signal processing unit 400 repeats operation S50 and compares the amplitude between the highest level and the lowest level of the focus error signal FES with respect to the data layer L(n+1) with the amplitude between the highest level and the lowest level of the focus error signal FES with respect to a subsequently detected data layer L(n+2). Then, the servo signal processing unit 400 repeats operation S60. If the amplitude between the highest level and the lowest level of the focus error signal FES with respect to the data layer L(n+1) is greater than the amplitude between the highest level and the lowest level of the focus error signal FES with respect to the subsequently detected data layer L(n+2), the servo signal processing unit 400 determines that the data layer L(n+1) is the target data layer L1 and does not move the objective lens 130 upwards any farther.

Likewise, if the amplitude between the highest level and the lowest level of the focus error signal FES with respect to the data layer L(n+1) is equal to or less than the amplitude between the highest level and the lowest level of the focus error signal FES with respect to the subsequently detected data layer L(n+2), the servo signal processing unit 400 again repeats operation S50, moves the objective lens 130 upwards and compares the amplitude between the highest level and the lowest level of the focus error signal FES with respect to the data layer L(n+2) with the amplitude between the highest level and the lowest level of the focus error signal FES with respect to a subsequently detected data layer L(n+3).

Thus, as illustrated in FIG. 9, since the amplitude p1 of the focus error signal FES in the data layer L1 is greater than the amplitude p2 in a data layer L2 and greater than the amplitude p0 in a data layer L0, the servo signal processing unit 400 determines the data layer L1 as the target data layer based on the relative sizes of the amplitudes of the data layers Ln. As described above, the servo signal processing unit 400 identifies the data layer L1 as the target data layer by determining that the amplitude of the focus error signal FES is greater than the amplitudes of adjacent data layers.

If a target data layer is the farthest data layer from the cover layer of the loaded optical disk, then the objective lens 130 does not detect any subsequent data layers while moving upward. For example, if the amplitude of the data layer Ln is less than the amplitude of a previous data layer L(n−1), the servo signal processing unit 400 moves the objective lens 130 upwards. Then, if subsequent data layers are not detected while the objective lens 130 moves upwards, the servo signal processing unit 400 determines that the data layer Ln is the farthest data layer Ln from the cover layer of the optical disk 1. In this case, if the magnitude of the focus drive signal FOD, which moves the objective lens 130 in a perpendicular direction with respect to the surface of the optical disk, reaches or exceeds a predetermined level, the servo signal processing unit 400 determines that no more data layers Ln exist beyond the most recently detected data layer Ln, and identifies the data layer L(n−1) detected immediately before the most recently detected data layer Ln as the target data layer L1 (FIG. 9).

According to prior art Japanese Patent Publication No. JP 2006/155792, if a new data layer Ln is not detected within the redetection time $T_r$ after a data layer Ln is detected, the detected data layer Ln is determined to be the target data layer Ln. However, according to an aspect of the present invention, if the magnitude of the focus drive signal FOD exceeds a predetermined level, a detected data layer Ln is determined to be the target data layer Ln. Thus, the prior art relies on using the redetection time $T_r$ to identify the target data layer Ln, in which case the zero crossing point may not be accurately detected due to a spherical aberration in an optical disk 1 having a plurality of data layers. Aspects of the present invention, however, more accurately detect a target data layer farthest from the cover layer, since the magnitude of the focus drive signal FOD is used. However, it is understood that the redetection time $T_r$ can be used in addition to using the magnitude of the FOD.

When the data layer L1 is determined to be the target data layer Ln using the method described above, the focal point of the optical beam 140 is focused, or maintained, on the data layer L0 by controlling a position of the objective lens 130. The focus actuator, which is driven by the focus drive signal FOD, moves the objective lens 130 of the optical pickup 100 back downwards to focus the optical beam 140 on the data layer L1, which is the target data layer Ln. When the focus actuator moves the objective lens 130 downwards, the focus error signal FES is output as an S curve which is symmetric to a pattern of an S curve generated when the objective lens 130 is moved upwards.

However, inertia is caused when the focus actuator moves the objective lens 130 upwards (i.e., when the optical beam 140 moves away from the cover layer). Accordingly, in the process of moving the objective lens 130 from an upward direction to a downward direction, the focus error signal FES is represented as the symmetrical S curve after an inertia generation duration illustrated in FIG. 9 elapses. Since the servo signal processing unit 400 determines that a new data layer Ln is detected if the focus error signal FES passes through a zero crossing point due to the inertia in the inertia generation duration, the magnitude of the focus error signal FES is accordingly reduced.

In order to prevent the inertia from increasing, when the target data layer L1 is detected, the servo signal processing unit 400 outputs the focus drive signal FOD to increase a downward speed of the focus actuator. By increasing a downward speed of the objective lens 130, the magnitude of an inertial force generated after moving the objective lens 130 upwards is offset.

Using the method described above, the objective lens 130 is moved downwards in operation S80 so that the focal point of the optical beam 140 is focused, or maintained, on the target data layer L1. When the focal point of the optical beam 140 is kept on the target data layer L1, the servo signal processing unit 400 outputs a focus servo-on signal at operation S90. Then, the focusing lead-in process to focus the optical beam 140 on the data layer L1 is completed at operation S100.

Figure 10:
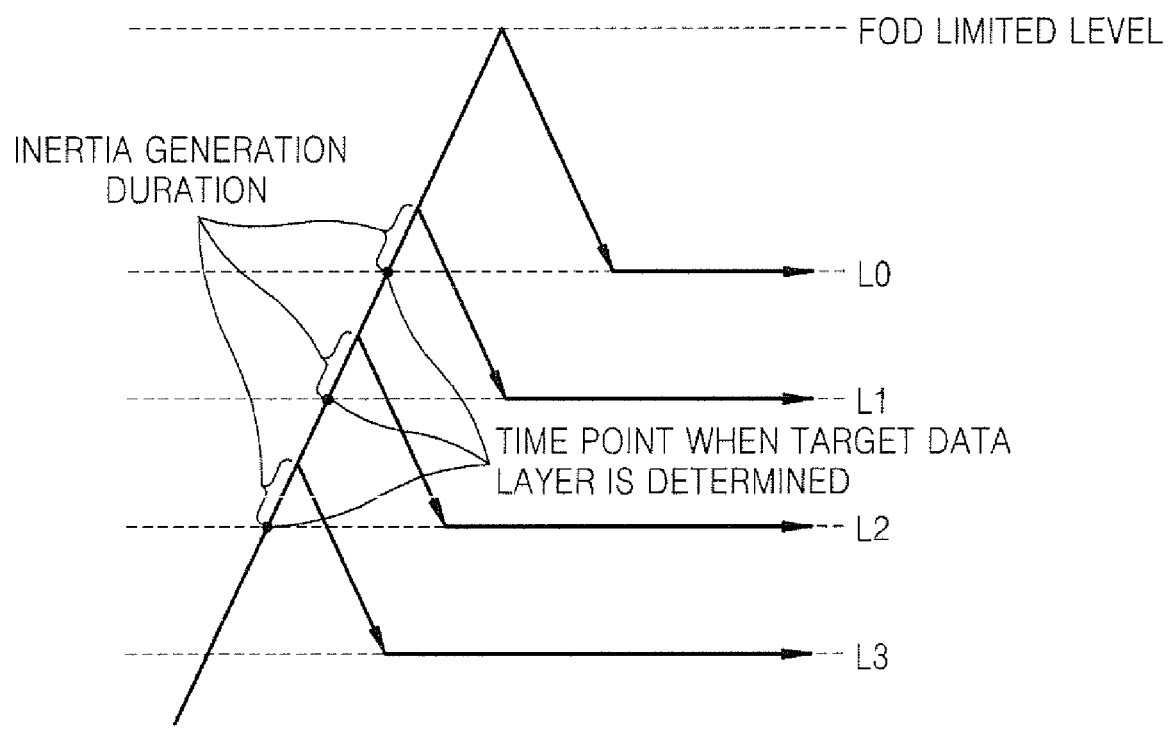
FIG. 10 is a diagram illustrating a position on which an optical beam is focused in a focusing lead-in process according to an embodiment of the present invention.

FIG. 10 is a diagram illustrating a position on which the optical beam 140 is focused in a focusing lead-in process according to an embodiment of the present invention. Referring to FIG. 10, it is assumed that a data layer closest to the cover layer is a data layer L3 and a data layer farthest from the cover layer is a data layer L0.

If a target data layer is the data layer L3, the servo signal processing unit 400 compares the amplitude of the focus error signal FES in the data layer L3 with the amplitude in a data layer L2. When the servo signal processing unit 400 identifies the data layer L3, the objective lens 130 is moved downwards so that the focal point of the optical beam 140 remains focused on the data layer L3. Although the servo signal processing unit 140 identifies the data layer L3 as the target data layer when the focal point of the optical beam 140 is focused on the data layer L2, the objective lens 130 should not be immediately moved downwards to the data layer L3 due to inertia. Instead, the objective lens 130 moved upwards a relatively small amount and passes through the data layer L2 due to inertia. Then, the objective lens 130 should be moved downwards to the data layer L3.

When the target data layer is the data layer L2 or a data layer L1, the focusing lead-in process is implemented using a similar method as described above with respect to the data layer L3. When the target data layer Ln is the data layer L0, even if the servo signal processing unit 400 moves the objective lens 130 upwards in order to detect a new data layer Ln having an amplitude which can be compared to the amplitude of the data layer L0, if the magnitude of the focus drive signal FOD reaches a predetermined level, the servo signal processing unit 400 determines that the data layer L0 is the target data layer Ln and moves the objective lens 130 downwards so that the focal point of the optical beam is maintained on the data layer L0.

The method according to an aspect of the present invention has been described above as detecting a target data layer using the characteristic that the amplitude of the focus error signal FES is at a maximum when a spherical aberration is optimally compensated for with respect to the target data layer Ln. However, aspects of the present invention are not limited to using this characteristic of the focus error signal FES, and may instead use other characteristics of the focus error signal FES. For example, a method according to another aspect of the present invention may detect the target data layer using the characteristic that a frequency of the focus error signal FES is at a minimum when a spherical aberration is optimally compensated for with respect to the target data layer Ln.

Thus, as illustrated in FIG. 9, if a spherical aberration is optimally compensated for with respect to the target data layer L1, since a frequency in the target data layer L1 is the lowest frequency compared to the frequencies of each of the data layers L0, L1, L2, L3, a time t1 in which the focus error signal FES of the target data layer L1 rises and falls is a longer time period than a time t2 in which the focus error signal FES of the data layer L2 rises and falls and also longer than a time t0 in which the focus error signal FES of the data layer L0 rises and falls. Therefore, by detecting the times t1, t2, and t0, the servo signal processing unit 400 can identify the target data layer L1. In other words, the servo signal processing unit 400 identifies the data layer L1 by determining that the time in which the focus error signal FES rises and falls is a longer time period than the time period in which the focus error signal FES rises and falls in adjacent data layers.

As described above, in a method according to an aspect of the present invention, when a focusing lead-in command is input, spherical aberration compensation for a target data layer Ln is first performed, and the greatest amplitude or the lowest frequency of the focus error signal FES with respect to the data layer Ln for which the spherical aberration is compensated is used. Thus, unlike the prior art, the focusing lead-in operation is accurately performed for every data layer in the multi-layer optical disk 1, even a data layer located in the middle of the multi-layer optical disk 1. Additionally, aspects of the present invention are not limited to using only an amplitude or a frequency of a focus error signal FES, and may instead use a combination of these characteristics or other characteristics of the focus error signal FES as well.

The focusing control method of an optical information storage media recording and/or reproduction apparatus 10 according to aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing aspects of the present invention can be easily construed by programmers skilled in the art to which the present invention pertains.

As described above, aspects of the present invention provide a method and an apparatus to quickly and accurately perform a focusing lead-in operation when a focusing operation is turned off for various reasons, such as when an external shock affects the optical recording and/or reproduction apparatus 10, or when a focusing lead-in operation is performed to record and/or reproduce data to and/or from a target data layer Ln of a loaded optical disk 1.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a focusing operation by moving an objective lens in a direction towards or away from an optical information storage medium comprising a plurality of data layers, the method comprising:
   receiving a focusing lead-in command signal to focus an optical beam on a target data layer;
   compensating for spherical aberration with respect to the target data layer;
   detecting a focus error signal based on an intensity of the optical beam reflected from the optical information storage medium and condensed by an optical detector;
   identifying the target data layer using an amplitude or a frequency of the focus error signal;
   focusing the optical beam on the target data layer by moving the objective lens in an opposite direction from a direction in which the objective lens is initially moved;
   identifying the n-th data layer as the target data layer, in response to the amplitude between the highest level and the lowest level of the focus error signal with respect to the n-th data layer being greater than the amplitude between the highest level and the lowest level of the focus error signal with respect to the (n+1)-th data layer;
   moving the objective lens away from the optical information storage medium; and
   moving the objective lens towards the optical information storage medium until an (n+2)-th data layer is detected, in response to the amplitude between the highest level and the lowest level of the focus error signal with respect to the (n+1)-th data layer being greater than the amplitude between the highest level and the lowest level of the focus error signal with respect to the n-th data layer,
   wherein the focusing of the optical beam on the target data layer comprises turning a focus servo signal on,
   wherein the identifying of the target data layer comprises identifying a data layer comprising a greatest amplitude of the focus error signal among a plurality of amplitudes corresponding to the plurality of data layers as the target data layer, and
   wherein the identifying of the target data layer further comprises:
     detecting an n-th data layer from among the plurality of data layers,
     detecting an (n+1)-th data layer by moving the objective lens towards the optical information storage medium, and
     comparing an amplitude between a highest level and a lowest level of the focus error signal with respect to the n-th data layer to an amplitude between a highest level and a lowest level of the focus error signal with respect to the (n+1)-th data layer.

2. A method of controlling a focusing operation by moving an objective lens in a direction towards or away from an optical information storage medium comprising a plurality of data layers, the method comprising:
   receiving a focusing lead-in command signal to focus an optical beam on a target data layer;
   compensating for spherical aberration with respect to the target data layer;
   detecting a focus error signal based on an intensity of the optical beam reflected from the optical information storage medium and condensed by an optical detector;
   identifying the target data layer using an amplitude or a frequency of the focus error signal; and
   focusing the optical beam on the target data layer by moving the objective lens in an opposite direction from a direction in which the objective lens is initially moved,
   wherein the focusing of the optical beam on the target data layer comprises turning a focus servo signal on,
   wherein the identifying of the target data layer comprises identifying a data layer having a lowest frequency of the focus error signal among a plurality of frequencies corresponding to the plurality of data layers as the target data layer, and
   wherein the identifying of the target data layer further comprises:
     detecting an n-th data layer from among the plurality of data layers,
     detecting an (n+1)-th data layer by moving the objective lens towards the optical information storage medium, and
     comparing a frequency of the focus error signal with respect to the n-th data layer and a frequency of the focus error signal with respect to the (n+1)-th data layer.

3. The method of claim 2, further comprising:
   identifying the n-th data layer as the target data layer, in response to the frequency of the focus error signal with respect to the n-th data layer being less than the frequency of the focus error signal with respect to the (n+1)-th data layer; and
   moving the objective lens away from the optical information storage medium.

4. The method of claim 3, further comprising moving the objective lens towards the optical information storage medium until an (n+2)-th data layer is detected, in response to the frequency of the focus error signal with respect to the (n+1)-th data layer being less than the frequency of the focus error signal with respect to the n-th data layer.

5. The method of claim 1, further comprising:
identifying the n-th data layer as the target data layer, in response to no more data layers being detected when a focus drive signal used to move the objective lens reaches a predetermined level after the n-th data layer is detected; and
moving the objective lens away from the optical information storage medium.

6. The method of claim 5, wherein the focus drive signal is generated such that a speed of the objective lens moving away from the optical information storage medium is greater than a speed of the objective lens moving towards the optical information storage medium.

7. An optical information storage medium recording and/or reproduction apparatus, comprising:
an optical pickup configured to condense light reflected from a loaded optical information storage medium comprising a plurality of data layers into an optical detector by moving an objective lens towards or away from the optical information storage medium;
a radio frequency (RF) amplifier configured to generate a focusing error signal from the condensed light;
a spherical aberration compensator configured to compensate for spherical aberration with respect to a target data layer;
a servo signal processing unit configured to:
identify the target data layer using an amplitude or a frequency of the focusing error signal; and
output a focusing drive signal used to move the objective lens in an opposite direction from a direction in which the objective lens is initially moved when the target data layer is identified; and
a driver configured to drive the optical pickup using the focusing drive signal,
wherein the servo signal processing unit is further configured to identify a data layer comprising a greatest amplitude of the focus error signal among a plurality of amplitudes corresponding to the plurality of data layers as the target data layer,
wherein the apparatus is configured to:
detect an n-th data layer from among the plurality of data layers,
detect an (n+1)-th data layer by moving the objective lens towards the optical information storage medium, and
compare:
an amplitude between a highest level and a lowest level of a focus error signal with respect to the n-th data layer, and
an amplitude between a highest level and a lowest level of the focus error signal with respect to the (n+1)-th data layer,
wherein, in response to the amplitude between the highest level and the lowest level of the focus error signal with respect to the n-th data layer being greater than the amplitude between the highest level and the lowest level of the focus error signal with respect to the (n+1)-th data layer, the apparatus is configured to:
identify the n-th data layer as the target data layer, and
move the objective lens away from the optical information storage medium, and
wherein, in response to the amplitude between the highest level and the lowest level of the focus error signal with respect to the (n+1)-th data layer being greater than the amplitude between the highest level and the lowest level of the focus error signal with respect to the n-th data layer, the apparatus is further configured to move the objective lens towards the optical information storage medium until an (n+2)-th data layer is detected.

8. An optical information storage medium recording and/or reproduction apparatus, comprising:
an optical pickup configured to condense light reflected from a loaded optical information storage medium comprising a plurality of data layers into an optical detector by moving an objective lens towards or away from the optical information storage medium;
a radio frequency (RF) amplifier configured to generate a focusing error signal from the condensed light;
a spherical aberration compensator configured to compensate for spherical aberration with respect to a target data layer;
a servo signal processing unit configured to:
identify the target data layer using an amplitude or a frequency of the focusing error signal; and
output a focusing drive signal used to move the objective lens in an opposite direction from a direction in which the objective lens is initially moved when the target data layer is identified; and
a driver configured to drive the optical pickup using the focusing drive signal,
wherein the servo signal processing unit is further configured to identify a data layer comprising a lowest frequency of the focus error signal among a plurality of frequencies corresponding to the plurality of data layers as the target data layer,
wherein the apparatus is further configured to:
detect an n-th data layer from among the plurality of data layers,
detect an (n+1)-th data layer by moving the objective lens towards the optical information storage medium, and
compare a frequency of the focus error signal with respect to the n-th data layer to a frequency of the focus error signal with respect to the (n+1)-th data layer.

9. The apparatus of claim 8, wherein, in response to the frequency of the focus error signal with respect to the n-th data layer being lower than the frequency of the focus error signal with respect to the (n+1)-th data layer, the apparatus is further configured to:
identify the n-th data layer as the target data layer; and
move the objective lens away from the optical information storage medium.

10. The apparatus of claim 9, wherein, in response to the frequency of the focus error signal with respect to the (n+1)-th data layer being lower than the frequency of the focus error signal with respect to the n-th data layer, the apparatus is further configured to move the objective lens towards the optical information storage medium until an (n+2)-th data layer is detected.

11. The apparatus of claim 7, wherein, in response to the servo signal processing unit not detecting any additional data layers when a focus drive signal used to move the objective lens reaches a predetermined level after the n-th data layer is detected, the apparatus is further configured to:
identify the n-th data layer as the target data layer; and
move the objective lens away from the optical information storage medium.

12. The apparatus of claim 11, wherein the focus drive signal is generated such that a speed of the objective lens moving away from the optical information storage medium is greater than a speed of the objective lens moving towards the optical information storage medium.

* * * * *